United States Patent [19]

Tobin et al.

[11] 4,381,798

[45] May 3, 1983

[54] COMBINATION REVERSING VALVE AND EXPANSION DEVICE FOR A REVERSIBLE REFRIGERATION CIRCUIT

[75] Inventors: Curtis L. Tobin, Chittenango; Joseph A. Ciarlei, Brewerton, both of N.Y.

[73] Assignee: Carrier Corporation, Syracuse, N.Y.

[21] Appl. No.: 294,963

[22] Filed: Aug. 21, 1981

Related U.S. Application Data

[62] Division of Ser. No. 126,057, Feb. 29, 1980, Pat. No. 4,311,020.

[51] Int. Cl.³ .............................................. F16K 11/07
[52] U.S. Cl. ................................. 137/625.43; 62/324.6
[58] Field of Search ...................... 62/504, 223, 524.6; 137/625.43

[56] References Cited

U.S. PATENT DOCUMENTS

| | | | |
|---|---|---|---|
| 2,750,764 | 6/1956 | Lynch | 62/160 |
| 3,242,687 | 3/1966 | Baker et al. | 62/223 X |
| 3,796,232 | 3/1974 | Dalton | 137/625.43 X |
| 4,221,237 | 9/1980 | Nelson | 137/625.43 X |

Primary Examiner—Lloyd L. King
Attorney, Agent, or Firm—Donald F. Daley; Robert P. Hayter

[57] ABSTRACT

Apparatus is disclosed for serving as both a reversing valve and an expansion device in a refrigeration circuit. A valve gate having passageways to direct refrigerant between the indoor and the outdoor heat exchangers to effect the function of a reversing valve is disclosed. In addition, the valve gate has multiple flow restriction devices which are selectively incorporated within a refrigeration circuit between the indoor heat exchanger and the outdoor heat exchanger to effect the appropriate amount of flow restriction dependent upon the mode of operation of the unit. These two functions may be incorporated into a single valve or they may be separated such that the separate functions are performed by separate valves. A cylindrical valve gate and multiple passageways for connecting the appropriate lines in a refrigeration circuit are described. The valve is rotated by a combination of an electromagnet spaced about the valve gate and a permanent magnet located within the valve gate.

12 Claims, 13 Drawing Figures

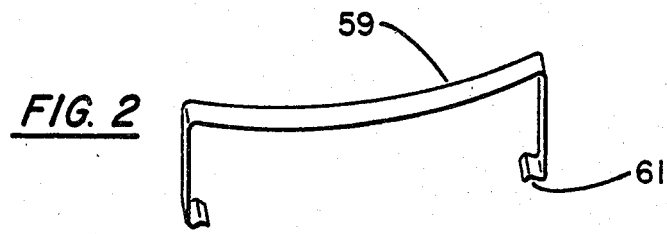
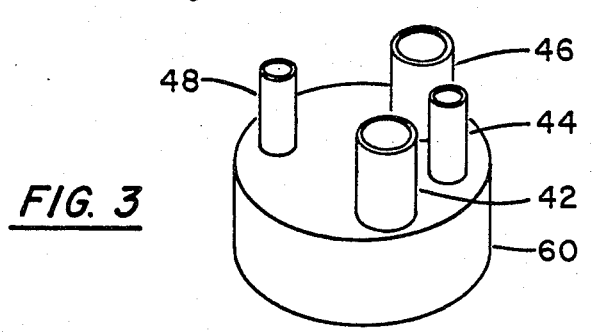
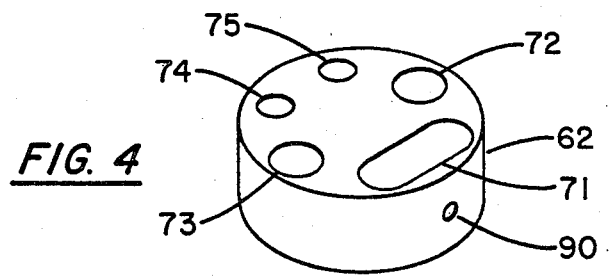
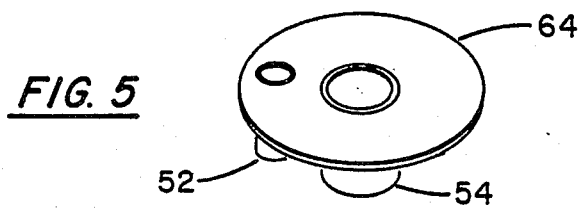
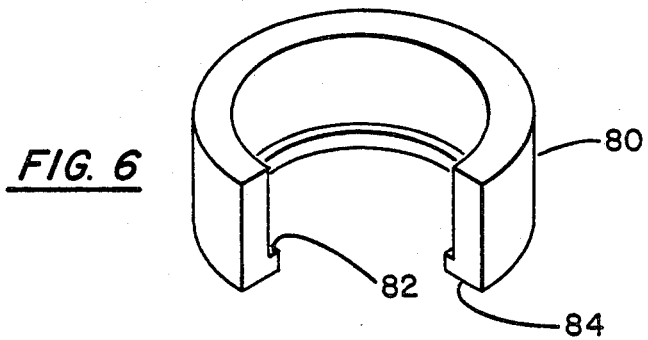

COMBINATION REVERSING VALVE AND EXPANSION DEVICE FOR A REVERSIBLE REFRIGERATION CIRCUIT

This application is a division of application Ser. No. 126,057, filed Feb. 29, 1980 now U.S. Pat. No. 4,311,020.

BACKGROUND OF THE INVENTION

1. Field of the Invention

The present invention relates to a reverse cycle refrigeration system. More specifically, the present invention relates to a combination reversing valve and expansion device to both direct refrigerant flow in a refrigeration circuit and to act as a pressure reducing expansion device depending upon the mode of operation of the refrigeration circuit.

2. Description of the Prior Art

In a conventional reversible refrigeration circuit an indoor heat exchanger and an outdoor heat exchanger are connected to a compressor and an expansion device to form a refrigeration circuit. A reversing valve is incorporated in the system to direct hot gaseous refrigerant to the heat exchanger serving as a condenser and to conduct cooled gaseous refrigerant from the heat exchanger acting as an evaporator back to the compressor.

When a reversible refrigeration circuit is acting to supply heating, the indoor heat exchanger serves as a condenser discharging heat energy from the refrigerant to the indoor air to be conditioned. When the unit is operated in the cooling mode, the reversing valve is switched and the indoor heat exchanger serves as an evaporator receiving liquid refrigerant from the expansion device and absorbing heat energy from the indoor air flowing through the indoor heat exchanger.

The expansion device in a refrigeration circuit serves to allow the pressure of the refrigerant to be reduced. By dropping the pressure from that of the condensing heat exchanger it is possible to evaporate the refrigerant at temperatures such that heat energy may be absorbed from the medium to be cooled. The expansion device is designed to perform a predetermined amount of pressure drop such that the design temperatures are achieved. Depending upon whether the unit is in the heating mode or the cooling mode will effect the sizing of the expansion device. Typically, a lesser pressure drop is desired when the unit is operating in the heating mode than when the unit is operating in a cooling mode.

Refrigerant reversing valves are known in the art and typically include a valve mechanism such that refrigerant flow may be directed from the compressor to either the indoor or outdoor heat exchanger and then conducted back to the compressor as received from either the indoor heat exchanger or the outdoor heat exchanger. Switching the compressor discharge and compressor suction between the heat exchangers is the function of the reversing valve. The reversing valve as disclosed herein utilizes a cylindrical valve gate having passageways therethrough. These passageways are designed to connect the appropriate connections depending upon the position of the valve. Typical expansion devices for use in a heat pump may include capillary tubes selected for each heat exchanger, an expansion device mounted in parallel with the check valve for each heat exchanger such that refrigerant flow in one direction is through the expansion device and in the other direction the refrigerant bypasses the expansion device through the check valve. Likewise, a single device having a movable piston such that the pressure drop in one direction is different from the pressure drop in an opposite direction has been utilized. The present invention utilizes a valve gate having two passageways therethrough, each having its own flow restriction. By switching the valve between one of the two positions, the appropriate expansion of refrigerant is accomplished by regulating the pressure drop.

The present invention additionally concerns the incorporation of the passageways serving as an expansion device in the same valve as the reversing valve such that one valve performs both the functions of the reversing valve and of two separate expansion devices in a reversible refrigeration circuit.

SUMMARY OF THE INVENTION

An object of the present invention is to provide a reversing valve for use in a reversible air conditioning circuit.

Another object of the present invention is to provide an expansion device capable of having separate amounts of flow restriction depending upon the mode of operation of the reversible refrigeration circuit.

Another object of the present invention is to combine an expansion device and reversing valve functions into a single valve assembly.

It is a further object of the present invention to provide a safe, economical, reliable and easy to manufacture valve for use in a refrigeration circuit.

These and other objects are achieved according to the preferred embodiment of the invention by the provision of a cylindrical valve housing having a cylindrical valve gate mounted therein. The housing has refrigerant connections to the compressor, the indoor heat exchanger and the outdoor heat exchanger. A valve gate is mounted within the housing having a series of passageways defined therein. These passageways operate to connect the compressor discharge to either the indoor heat exchanger or the outdoor heat exchanger depending upon the mode of operation, the compressor suction to either the indoor heat exchanger or the outdoor heat exchanger depending upon the mode of operation and the indoor heat exchanger to the outdoor heat exchanger through one of two flow restricted passageways again depending upon the mode of operation.

When the unit is in the heating mode of operation the refrigerant being discharged from the compressor is directed to the indoor heat exchanger where it is condensed giving off heat to the enclosure. This refrigerant then flows through the expansion device portion of the valve assembly to the outdoor heat exchanger. From the outdoor heat exchanger the refrigerant flows again through the reversing valve portion of the valve assembly to the compressor to complete the circuit. In the cooling mode of operation the flow is reversed such that the compressor discharge is directed to the outdoor heat exchanger and then through the expansion valve portion of the valve assembly and to the indoor heat exchanger. From the indoor heat exchanger it is then directed through the reversing valve portion of the valve assembly back to the compressor to complete the circuit.

BRIEF DESCRIPTION OF THE DRAWINGS

FIG. 2 is an isometric view of a spring clip for securing the components of the valve assembly.

FIG. 3 is an isometric view of the upper housing of the valve assembly.

FIG. 4 is an isometric view of the valve gate of the valve assembly.

FIG. 5 is an isometric view of the lower housing of the valve assembly.

FIG. 6 is an isometric view of an electromagnet utilized to change the position of the valve gate of the valve assembly.

DESCRIPTION OF THE PREFERRED EMBODIMENT

The preferred embodiment as described herein will be described with a reversible refrigeration circuit adapted for supplying air conditioning to an enclosure. It has been understood that the invention has like applicability to general refrigeration applications as well as air conditioning applications. It is further to be understood that although the valve assembly has been described with reference to a particular embodiment that the same design concepts may apply to embodiments of varying configurations and that the reversing valve and expansion device assemblies may be singly designed aside from the combination device as disclosed.

Figure 1:
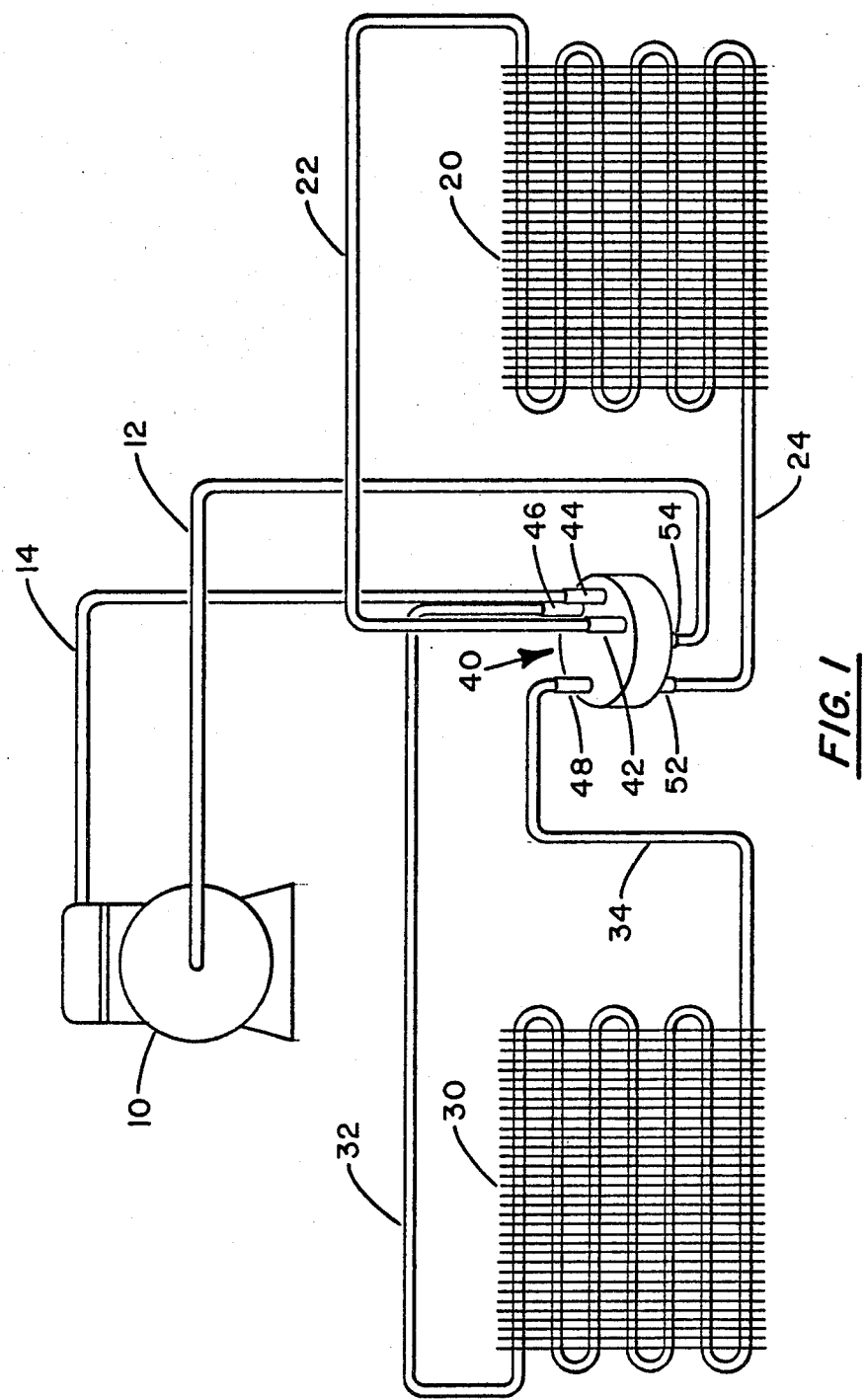
FIG. 1 is a schematic view of a refrigeration circuit incorporating the claimed valve assembly.
Figure 7:
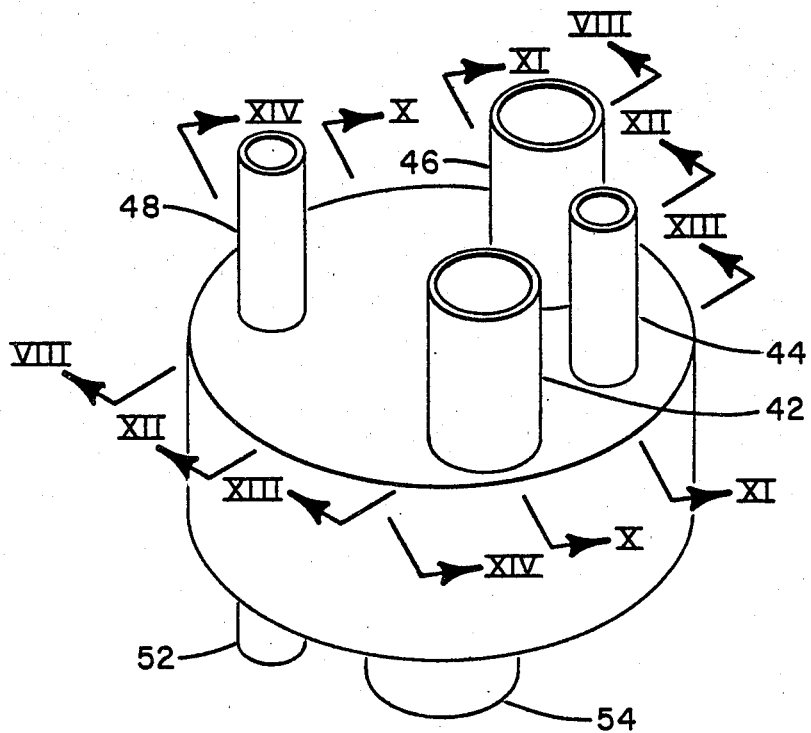
FIG. 7 is an isometric view of a partially assembled valve assembly.

Referring now to FIG. 1 there can be seen a schematic view of a refrigeration circuit having compressor 10, indoor heat exchanger 30, outdoor heat exchanger 20 and a valve assembly 40. Discharge line 14 connects compressor 10 to port 44 of the valve assembly. Suction line 12 connects compressor 10 to port 54 of the valve assembly. Line 32 connects port 46 of the valve assembly to the indoor heat exchanger and line 34 connects the indoor heat exchanger to port 48 of the valve assembly. Line 24 connects port 52 of the valve assembly to outdoor heat exchanger 20 and line 22 connects outdoor heat exchanger 20 to port 42 of the valve assembly.

During operation of the refrigeration circuit as disclosed in FIG. 1 hot gaseous refrigerant is discharged from the compressor into discharge line 14 wherein it is conducted to port 44 of the valve assembly. In the heating mode of operation this hot gaseous refrigerant is then directed to port 46 through line 32 to the indoor heat exchanger 30 where it is condensed giving off heat energy to the air to be conditioned. The liquid refrigerant is then conducted from line 34 to port 48 of the valve assembly. In the valve assembly the liquid refrigerant undergoes a pressure drop and is then conducted through port 52 to line 24 to outdoor heat exchanger 20 where it is evaporated absorbing heat energy from the ambient air in communication with the outdoor heat exchanger. Gaseous refrigerant from the outdoor heat exchanger 20 is conducted from line 22 to port 42 of the valve assembly and from there through port 54 of the valve assembly through suction line 12 back to the compressor to complete the circuit.

During the cooling operation, hot gaseous refrigerant traveling through discharge line 14 is conducted to port 44 by the valve assembly to be discharged therefrom through port 42 through line 22 to the outdoor heat exchanger 20 wherein hot gaseous refrigerant is condensed to a liquid. Liquid refrigerant is then conducted through line 24, port 52 through the expansion restriction within the valve assembly 40 and discharged from port 48 through line 34 to the indoor heat exchanger 30. The liquid refrigerant is evaporated in indoor heat exchanger 30 absorbing heat energy from the air to be conditioned and the gaseous refrigerant is returned through line 32, port 46 through the valve assembly to port 54 and through suction line 12 to the compressor.

Figures 9, 10, 11:
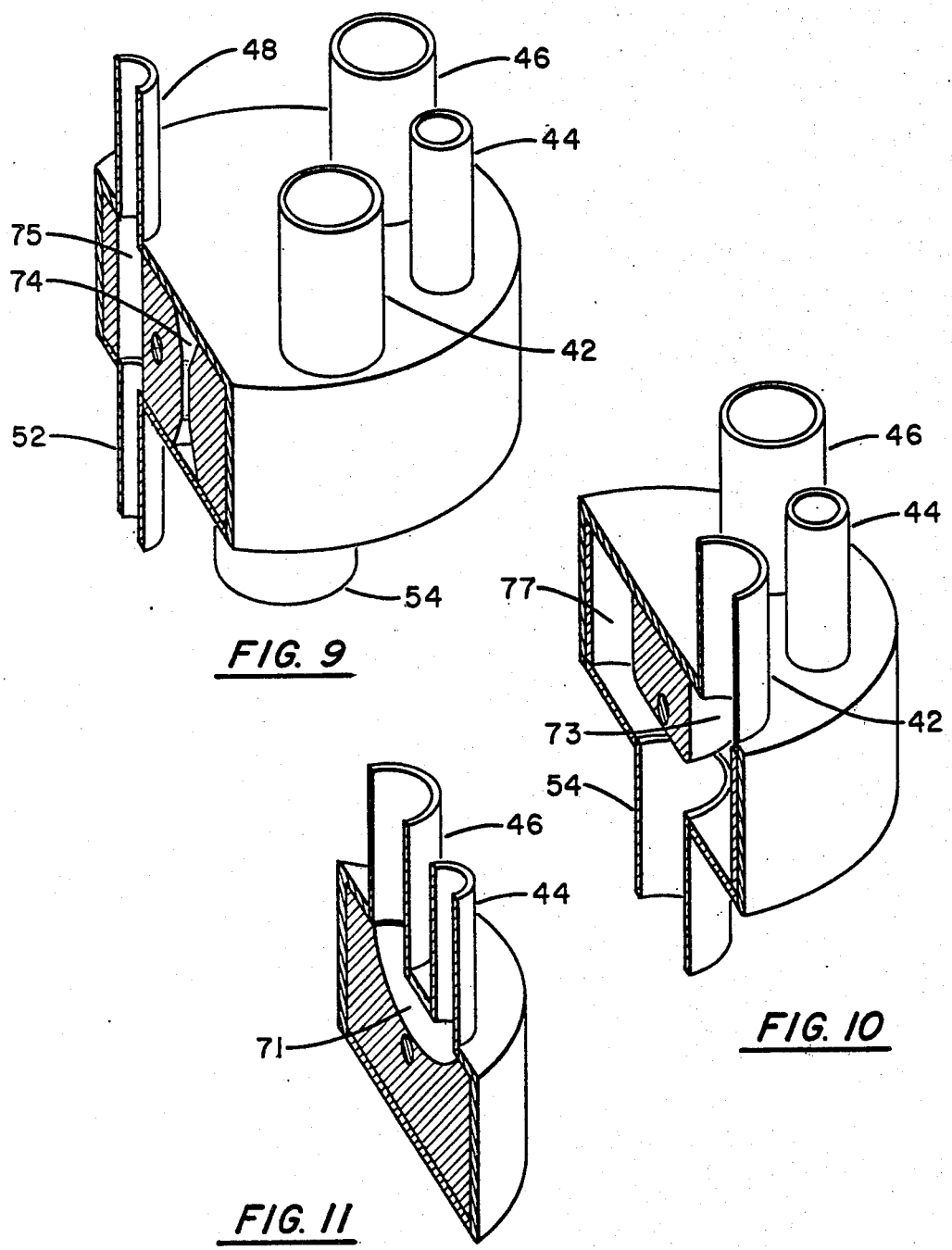
FIG. 9 is a cross sectional view of the valve assembly taken along line IX—IX of FIG. 7.
FIG. 10. is a cross sectional view of the valve assembly taken along line X—X of FIG. 7.
FIG. 11 is a cross sectional view of the valve assembly taken along line XI—XI of a FIG. 7.

Referring now to FIGS. 2 through 6, a series of figures drawn in an exploded view of the valve assembly, it may be seen that there are five essential components of this valve assembly. FIG. 3 shows an upper housing of the valve assembly having ports 42, 44, 46 and 48 to which lines 12, 14, 22 and 32 may be connected. Upper housing 60 is generally cylindrical in configuration and is adapted to have gate 62 rotate therein. Lower housing 64 shown in FIG. 5 has ports 52 and 54 formed therein for connection to lines 24 and 12 respectively. Valve gate 62 is shown in FIG. 4 and as can be seen therein has a slot 71 and openings 72, 73, 74 and 75 appearing at the top thereof. Permanent magnet 90 is mounted across the gate. A cross sectional view of slot 74 as shown in FIG. 9 indicates the restrictive nature of opening 74 to create expansion of the refrigerant as it undergoes a pressure drop flowing therethrough. Electromagnet 80 shown in FIG. 6 has a lip 82 at the bottom thereof such that when assembled lower housing 64 sits on lip 82, and gate 62 is contained between the lower and upper housing to form a fluid tight valve assembly. Spring 59 is placed over the unit with tabs 61 engaging bottom surface 84 of the electromagnet to maintain the various components in fixed relation.

Figure 12:
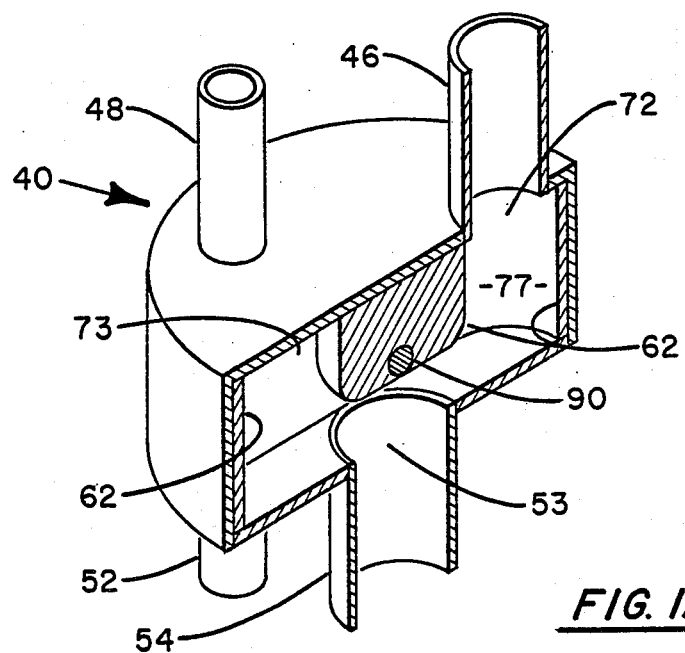
FIG. 12 is a cross sectional view of the valve assembly taken along line XII—XII of FIG. 7.

As can be better seen in FIGS. 7 through 13, gate 62 forms first passageway 71 shown as a slot in FIG. 4 and second passageway 77 having openings 72, 73 and 53 as seen in FIG. 4. The second passageway acts to connect either ports 46 or 42 to the compressor suction line such that refrigerant gas to be conducted back to the compressor enters the valve assembly through either port 46 or port 42. This gaseous refrigerant is directed from port 46 and port 42 through second passageway 77 and then discharged through port 54 to the compressor suction line 12. As seen in FIG. 12, the valve gate is arranged in a position such that the unit is in the cooling mode of operation with gaseous refrigerant being removed from indoor heat exchanger 30 through port 46 and discharged through port 54 to compressor 10. In the heating mode of operation as shown in FIG. 10, the valve gate is rotated, counterclockwise from the position shown in FIG. 7 such that opening 73 of the second passageway 77 is aligned with port 42. In this mode of operation gaseous refrigerant from the outdoor heat exchanger is withdrawn to the compressor.

Figure 13:
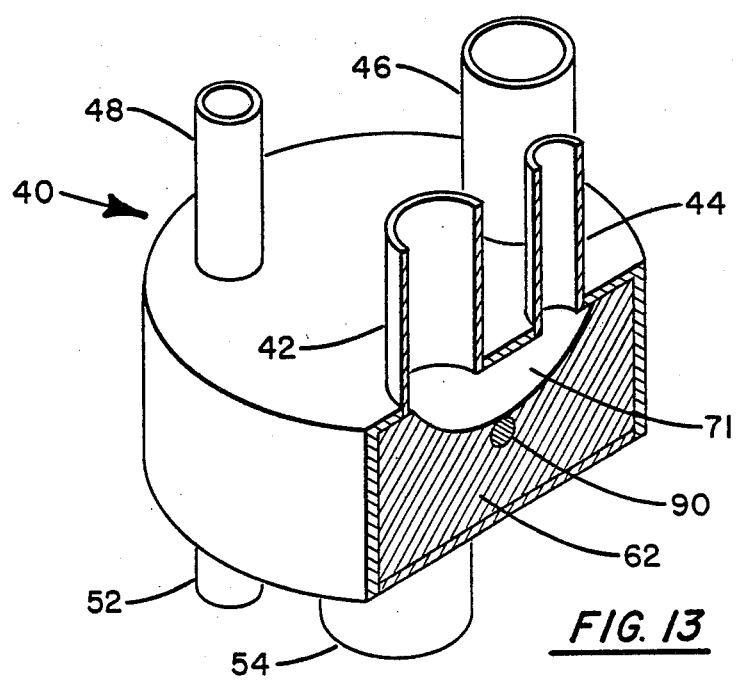
FIG. 13 is a cross sectional view of the valve assembly taken along line XIII—XIII of FIG. 7.

Referring now to FIG. 13, it can be seen that first passageway 71 connects port 44 which is connected to compressor discharge line 14 to port 42 which is connected to the outdoor heat exchanger 20. As shown this is in the cooling mode of operation and hot gaseous refrigerant is directed to the outdoor heat exchanger serving as a condenser. In the heating mode of operation as shown in FIG. 11 the valve gate position is switched and first passageway 71 connects port 44 to port 46 such that the hot gaseous refrigerant is directed to the indoor heat exchanger for supplying heat energy to the enclosure.

Figure 8:
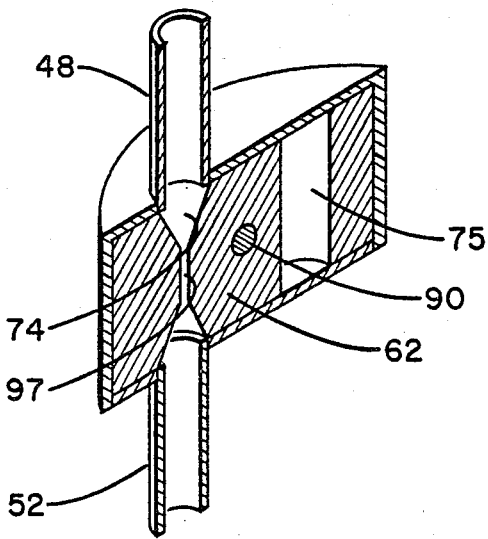
FIG. 8 is a cross sectional view of the valve assembly taken along line VIII—VIII in FIG. 7.

Openings 74 and 75, as shown in gate 62 in FIG. 4, extend through the gate forming a third and fourth passageway for the flow of refrigerant therethrough. FIGS. 8 and 9 show a cross sectional view of gate 62 taken at opening 74. It can be seen that there is a flow restriction portion 97 formed in the opening such that the liquid refrigerant flowing therethrough undergoes a pressure drop. In the cooling mode of operation with the valve gate in the position shown in FIG. 8, opening 74 will join port 48 to port 52. Hence the refrigerant to be expanded in the indoor heat exchanger undergoes a pressure drop which is a function of the internal flow restriction configuration of the third passageway having opening 74. In the heating mode of operation the valve gate is rotated and the fourth passageway having an opening 75 is placed between ports 48 and 52 such that the refrigerant undergoes a pressure drop which is a function of the configuration of the fourth passageway, this configuration usually being different from that of the third passageway. As seen herein, the fourth passageway is a straight tube, however, it is to be understood that the passageway may be restricted similar to the third passageway.

There has been described herein a combination reversing valve and multiple passageway expansion device such that as the valve is rotated to switch the direction of refrigerant flow in the refrigeration circuit, the appropriate restriction for obtaining the appropriate refrigerant expansion between the condenser and the evaporator is selected. Hence, as the reversing valve is placed in the heating mode of operation the heating mode flow restriction for the expansion device is selected and as the valve assembly is placed in the cooling mode the flow restriction best suited for the cooling mode of operation is selected. It should be understood that this valve may be utilized solely to perform the reversing function or solely as an expansion device.

It is to be understood that the invention has been described herein with reference to a particular embodiment but that variations and modifications can be effected within the spirit and scope of the invention.

We claim:

1. A reversing valve for use in a refrigeration circuit for altering the flow path of refrigerant therethrough which comprises:
    a valve housing having at least four ports, a first port adapted to be connected to receive refrigerant from a compressor, a second port adapted to be connected to a first heat exchanger, a third port adapted to be connected to a second heat exchanger and a fourth port adapted to be connected to pass refrigerant to the compressor;
    a cylindrical valve gate mounted within the housing, said valve gate having a first U-shaped passageway located within a top portion of the valve gate for directing fluid flow from the first port to the second port when the valve is in a first position and to the third port when the valve is in a second position and a second passageway extending across the bottom of the valve gate in communication with the fourth port and having end portions for connecting either to the second port or the third port, said second passageway passing fluid flow from the third port to the fourth port when the valve is in the first position and from the second port to the fourth port when the valve is in the second position; and
    means for placing the valve in the first and second positions.

2. The apparatus as set forth in claim 1 wherein the housing is generally cylindrical in configuration and wherein the valve gate is also generally cylindrical in configuration and is rotatably mounted within the housing.

3. The apparatus as set forth in claim 2 wherein the first, second and third ports enter the housing from above and the fourth port enters the housing from below.

4. The apparatus as set forth in claim 3 wherein the first passageway is a slot shaped void in the valve gate with the ends of the void being in fluid communication with the first port and the second port when the valve is in the first position and in fluid communication with the first port and third port when the valve is in the second position.

5. The apparatus as set forth in claim 3 wherein the second passageway is a void in the valve gate extending from the top of the valve gate to the bottom of the valve gate such that it is in fluid flow communication with the fourth port regardless of the position of the valve, the top portion of the second passageway being in fluid flow communication with the third port when the valve is in the first position and the second port when the valve is in the second position.

6. The apparatus as set forth in claim 1 wherein the means for placing the valve in the first and second positions includes
    an electromagnet mounted about the housing, and
    a permanent magnet mounted in the valve gate which, upon the appropriate electromagnet energization, will cause the valve gate to rotate to the selected position.

7. The apparatus as set forth in claim 1 wherein the valve housing has a fifth port adapted to be connected to the first heat exchanger and a sixth port adapted to be connected to the second heat exchanger, and wherein the valve gate further defines a third passageway and a fourth passageway, the third passageway connecting the fifth port to the sixth port when the valve is in the first position and the fourth passageway connecting the fifth port to the sixth port when the valve is in the second position.

8. The apparatus as set forth in claim 7 wherein at least one of the third passageway or the fourth passageway is flow restrictive creating a pressure drop in the fluid flowing therethrough.

9. An expansion device for use with a reversible refrigeration circuit which comprises:
    a valve housing having a first refrigerant connection and a second refrigerant connection;
    a valve gate mounted within the valve housing, said valve gate defining at least two distinct passageways for conducting refrigerant between the first connection and the second connection, at least one of said passageways including a flow restriction to create a pressure drop in the refrigerant flowing therethrough; and
    means for displacing the valve gate such that when the valve is in a first position a first passageway having a predetermined flow restriction forms a fluid flow path between the connections and when the valve is in a second position a second passageway having a preselected flow restriction forms a fluid flow path between the connections.

10. The apparatus as set forth in claim 9 wherein when the refrigeration circuit is in a first mode of operation the first passageway forms the fluid flow path between the refrigerant connections and when the refrigeration circuit is in a second different mode of operation the second passageway forms the fluid flow path between the refrigerant connections.

11. The apparatus as set forth in claim 9 wherein the refrigeration circuit includes a reversing valve and wherein the reversing valve and valve gate are both actuated in response to the mode of operation of the refrigeration circuit.

12. An expansion device for use with a refrigeration circuit which comprises:
   a valve housing having a refrigerant inlet and a refrigerant outlet
   a movable valve body mounted within the valve housing, said valve body defining a plurality of distinct flow restrictive passageways, each passageway having a configuration selected to effect a predetermined pressure drop of the refrigerant flowing therethrough; and
   means to displace the valve body such that one of the passageways forms a fluid flow path from the refrigerant inlet to the refrigerant outlet whereby by the selection of the appropriate passageway the pressure drop of the refrigerant flowing through the passageway is regulated.

* * * * *